United States Patent
Vissenberg et al.

(10) Patent No.: US 9,465,138 B2
(45) Date of Patent: *Oct. 11, 2016

(54) PRESENCE DETECTION USING SPLIT BEAM LUMINAIRE

(71) Applicant: KONINKLIJKE PHILIPS N.V., Eindhoven (NL)

(72) Inventors: Michel Cornelis Josephus Marie Vissenberg, Roermond (NL); Willem Franke Pasveer, Dordrecht (NL); Antonius Petrus Marinus Dingemans, Tilburg (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 27 days.

This patent is subject to a terminal disclaimer.

(21) Appl. No.: 14/357,431

(22) PCT Filed: Oct. 24, 2012

(86) PCT No.: PCT/IB2012/055836
§ 371 (c)(1),
(2) Date: May 9, 2014

(87) PCT Pub. No.: WO2013/068866
PCT Pub. Date: May 16, 2013

(65) Prior Publication Data
US 2014/0312779 A1    Oct. 23, 2014

Related U.S. Application Data

(60) Provisional application No. 61/557,969, filed on Nov. 10, 2011.

(51) Int. Cl.
*H05B 37/02* (2006.01)
*G01B 11/14* (2006.01)
(Continued)

(52) U.S. Cl.
CPC ............ *G01V 8/10* (2013.01); *H05B 33/0851* (2013.01); *H05B 33/0854* (2013.01); *H05B 37/0227* (2013.01); *Y02B 20/44* (2013.01)

(58) Field of Classification Search
CPC .. G01B 11/14; G01B 11/026; G05B 33/0851
USPC ......... 315/153, 152, 150, 155; 356/614, 448
See application file for complete search history.

(56) References Cited

U.S. PATENT DOCUMENTS

| | | | |
|---|---|---|---|
| 6,548,967 B1 | 4/2003 | Dowling et al. | |
| 2006/0023461 A1* | 2/2006 | Knight | B60Q 1/076 362/466 |

(Continued)

FOREIGN PATENT DOCUMENTS

| | | | |
|---|---|---|---|
| CN | 101825697 A | | 9/2010 |
| EP | 1707970 A1 * | | 8/2006 |

(Continued)

OTHER PUBLICATIONS

Publisher: WO 2009/133505 A1, Author:Feri et al, Title: Illumination Unit Responsive to objects, Date Nov. 5, 2009.*

*Primary Examiner* — Thai Pham
*Assistant Examiner* — Wei Chan
(74) *Attorney, Agent, or Firm* — Meenakshy Chakravorty

(57) ABSTRACT

The invention relates to a method for determining presence of objects in an area (207) surrounding a luminaire (200). The luminaire (200) includes a first light source (203), a second light source (205), and a sensor (216). The first light source (203) is configured to emit a first light beam (204) adapted to illuminate a first predefined area. The second light source (205) is configured to emit a second light beam (206) adapted to illuminate a background area surrounding the first predefined area. The sensor (216) is configured to detect a back-reflected first light beam (210) and a back-reflected second light beam (212). The method includes determining whether objects are present in the area surrounding the luminaire based on a comparison of information indicative of a signal strength of the detected back-reflected first light beam (210) and information indicative of a signal strength of the detected back-reflected second light beam (212).

11 Claims, 9 Drawing Sheets

(51) Int. Cl.
*G01V 8/10* (2006.01)
*H05B 33/08* (2006.01)

(56) References Cited

U.S. PATENT DOCUMENTS

| | | | |
|---|---|---|---|
| 2006/0108514 A1* | 5/2006 | Maruyama | 250/221 |
| 2007/0290621 A1* | 12/2007 | Clark et al. | 315/113 |
| 2008/0136356 A1* | 6/2008 | Zampini | G06Q 30/0241 315/308 |
| 2009/0251070 A1* | 10/2009 | Petzl | H05B 33/0803 315/297 |
| 2010/0176732 A1 | 7/2010 | Schenk et al. | |
| 2010/0191418 A1 | 7/2010 | Mimeault et al. | |
| 2010/0219761 A1 | 9/2010 | Damink et al. | |

FOREIGN PATENT DOCUMENTS

| | | | |
|---|---|---|---|
| WO | 2006111930 A2 | 10/2006 | |
| WO | WO 2006111927 A1 * | 10/2006 | H05B 37/02 |
| WO | 2008050294 A1 | 5/2008 | |
| WO | 2009133505 A1 | 11/2009 | |
| WO | 2010070520 A1 | 6/2010 | |
| WO | 2011039690 A1 | 4/2011 | |

* cited by examiner

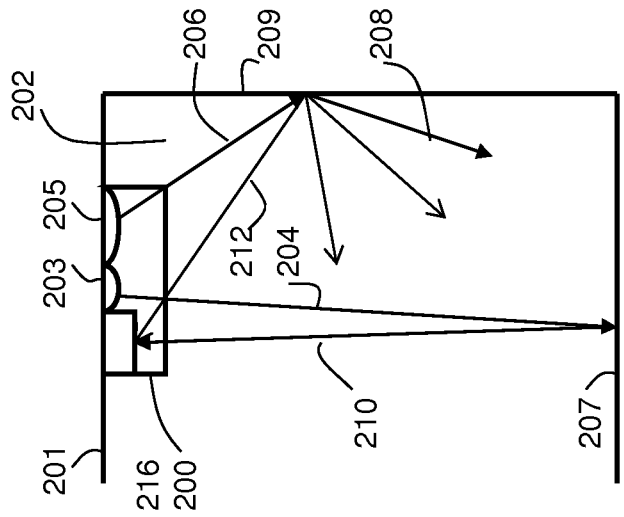
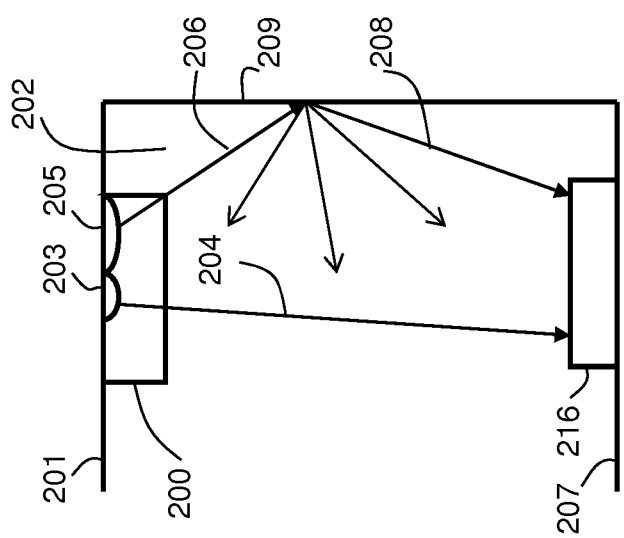

PRESENCE DETECTION USING SPLIT BEAM LUMINAIRE

CROSS-REFERENCE TO PRIOR APPLICATIONS

This application is the U.S. National Phase application under 35 U.S.C. §371 of International Application No. PCT/IB2012/055836, filed on Oct. 24, 2012, which claims the benefit of U.S. Provisional Patent Application No. Application No. 61/557,969, filed on Nov. 10, 2011. These applications are hereby incorporated by reference herein.

FIELD OF THE INVENTION

Embodiments of the present invention relate generally to the field of illumination systems, and, more specifically, to a method and system for determining presence of objects in an area surrounding a split beam luminaire.

BACKGROUND OF THE INVENTION

As the efficacy (measured in lumen per Watt) and the luminous flux (measured in lumen) of light emitting diodes (LEDs) continues to increase and prices continue to go down, LED illumination and LED-based luminaires are becoming viable alternatives to and at a competitive level with until now predominant common light bulbs or tube luminescent based lamps for providing large-area illumination.

By using LEDs it is possible to decrease the energy consumption, a requirement which is well in line with the current environmental trend. Further, as a consequence of having the possibilities to provide bright light even when using compact LEDs, a number of lighting systems has been proposed greatly differing from the standard lighting systems comprising a common light bulb. In line with this and by means of using LEDs instead of light bulbs, a user is also given a more flexible control of the lighting system illumination functionalities, for example in relation to intensity dimming control or beam direction.

An example of such a lighting system is disclosed in WO 2011/039690, describing a modular luminaire 100 comprising two light-emitting portions 102 and 104, as shown in FIG. 1. The two portions are individually controllable and are configured to provide complementary beam patterns. The portion 102 includes light sources 106 and is adapted to generate a relatively narrow beam of light illuminating a narrow, task, area. The portion 104 includes light sources 108 and is adapted to generate a relatively wide, batwing-type beam of light providing ambient illumination of a background area surrounding the task area. Besides providing the advantages of a lower cost and a higher comfort level in comparison with conventional office luminaires, such a split beam luminaire enables a local dimming lighting solution with higher energy savings because it allows selectively dimming of lighting fixtures that are not directly above occupied task areas. However, even with such an advanced luminaire, it is always desirable to try to reduce energy consumption even further.

SUMMARY OF THE INVENTION

According to one aspect of the present invention, a method is provided for determining presence of one or more objects in an area surrounding a first luminaire. The first luminaire is a split beam luminaire comprising at least two light sources configured to emit light beams with different beam patterns. The first light source of the luminaire is configured to emit a first light beam adapted to illuminate a first predefined area and the second light source is configured to emit a second light beam adapted to illuminate a background area surrounding the first predefined area. The first luminaire also includes a sensor configured to detect a back-reflected first light beam and a back-reflected second light beam. The method includes a step of determining whether the one or more objects are present in the area surrounding the luminaire based on a comparison of information indicative of a signal strength of the detected back-reflected first light beam and information indicative of a signal strength of the detected back-reflected second light beam.

As used herein the term "beam pattern" of a light source refers to the intensity distribution of the light source which gives the flux per solid angle in all direction of space.

The first light source may be configured to emit a light beam with relatively narrow beam pattern (so-called "task beam"), adapted to illuminate a predefined area, e.g. 2×25-2×35 degrees full width half maximum (FWHM). This way, the task beam may cover the area that is associated with a single luminaire in a typical office layout. The beam pattern of the task beam is preferably confined within approximately 2×50 degrees cut-off angle in order to avoid that the task beam is illuminating the area below a neighboring luminaire.

The second light source may be configured to emit a light beam with a relatively wide beam pattern (so-called "ambient beam"), adapted to illuminate a background area surrounding the predefined area illuminated with the task beam. The beam pattern of the ambient beam is preferably hollow shaped, e.g. a beam pattern with a low intensity at 0 degrees and a peak intensity between 30 and 45 degrees, where, as used herein, the term "hollow shaped light beam" refers to a beam of light leaving a relatively dark area within the center. The beam pattern of the ambient beam is preferably used to illuminate a region in between approximately 2×20 degrees (in order to have a smooth overlap with the task beam) and 2×60 degrees (about 65 degrees is the typical cut-off angle for European office luminaires, to avoid indirect glare). In other regions of the world, the norms on glare are often less strict. For these regions, the peak intensity and the beam cut-off may be shifted to larger angles.

Further, as used herein, the terms "back-reflected beam of a light source," "back-reflected signals of a light source" and variations thereof refer to beams which are incident on a sensor not as a result of the direct illumination of the sensor by the light source, but as a result of beams generated by the light source in one main direction being reflected in the substantially opposite direction. FIGS. 2A and 2B schematically illustrate the difference between direct or forward-reflected illumination and back-reflected illumination of a sensor. As shown in FIG. 2A, a luminaire 200 installed in the ceiling 201 of an office space 202 includes a first light source 203 emitting a first light beam 204, the task beam, and a second light source 205 emitting a second light beam 206, the ambient beam. A sensor 216 installed e.g. on the floor or workplane area 207 of the office space 202 is directly illuminated by the first light beam 204. The sensor 216 is also illuminated by a beam 208 which is a result of the forward reflection of the second light beam 206 from a point A of e.g. a wall 209 or some other object. The reflection at point A is likely to be diffusive, which is shown in FIG. 2A with multiple beams originating from the point A, among which is the beam 208. Of course, the reflection at point A could also be specular where only the beam 208 would be the resulting forward-reflected beam.

In contrast to FIG. 2A, if the sensor 216 was installed also somewhere in the ceiling 201, e.g. if the sensor 216 was included within the luminaire 200, as shown in FIG. 2B, then the sensor 216 would be illuminated by a beam 210, which is a result of the back-reflection of the first light beam 204 from e.g. the floor or the workplane area 207 and by a beam 212, which is a result of the diffusive back-reflection of the second light beam 206 from the point A of. The main direction of propagation of the beams 210 and 212 is opposite to that of the main direction of propagation of the beams 204, 206, and 208. Therefore, beams like the beams 210 and 212 are referred to as "back-reflected" beams.

Embodiments of the present invention are, in part, based on the recognition that optimum dimming levels of the luminaires in a small room, a corridor, or a room separated in sections by walls or cupboards, e.g. a cell office, are different from the optimum dimming levels of the luminaires in a large open space. Since operation at optimum dimming levels allows decreasing energy consumption of the lighting system, it would, therefore, be desirable to account for the presence of objects, particularly relatively large vertical objects such as walls or cupboards in the surrounding of the luminaires. This could be done by a commissioning effort during the installation of luminaires where it is immediately clear whether or not any objects would be in the surrounding of those luminaires. As commonly used in the art, the term "commissioning" refers to configuring, possibly manual or at least with a human input, control settings for a luminaire, e.g. configuring dimming levels and drive signals for a luminaire.

Commissioning solution described above has, however, a number of drawbacks. First, commissioning adds cost and complexity to the lighting system. In addition, open-plan offices may be changed into cell offices by placing walls in the open space. Continuing to operate the lighting system at the optimum dimming levels then would require re-commissioning or even replacement of the luminaires, which would be troublesome and costly.

Therefore, it would be desirable to be able to obtain information regarding presence of objects in the surrounding of the luminaire in an automatic manner and at any time (i.e., dynamically). To that end, embodiments of the present invention are further based on the recognition that, when a split beam luminaire is employed, surprisingly, the back-reflected signals of the task and ambient beams of a luminaire are strongly dependent on the presence of objects in the surrounding of the luminaire. Specifically, the relation between the back-reflected signals of the task and ambient beams of a luminaire in an open space (i.e., no objects in the surrounding of the luminaire) is different from that in a space where objects, particularly large vertical objects such as walls or cupboards, are present. If for a luminaire in an open space the signal strength of the back-reflected task beam detected by a sensor included in or substantially near the luminaire is greater than the signal strength of the back-reflected ambient beam detected by that sensor, then that relationship between the signal strengths of the back-reflected beams is reversed for a luminaire having objects in its surrounding. Namely, the signal strength of the detected back-reflected task beam, possibly normalized by the lumen output of the task beam as described below, is smaller than the signal strength of the detected back-reflected ambient beam, possibly normalized by the lumen output of the ambient beam, for luminaires having objects in their surrounding, where the larger and the more vertical are the objects, the greater is the difference between the signal strengths of the detected back-reflected task and ambient beams. As a result, by comparing information indicative of the signal strengths of the detected back-reflected task beam and the detected back-reflected ambient beam it is possible to draw conclusions regarding the presence of objects in the surrounding of the luminaire. The obtained information regarding the presence of objects in the surrounding of the luminaire may then be used for various purposes. One use of the obtained information could include decreasing the energy consumption of the lighting system by setting the dimming level of the one or more luminaires in a manner that accounts for the presence (or absence) of objects in the surrounding of the luminaires. Other uses could include e.g. setting the more appropriate dimming level of the luminaires considering that e.g. cell offices require more light to balance absorption by the walls, and/or changing the balance between task and ambient beam such as e.g. boosting the ambient beam with respect to the task beam to increase illumination of the walls, thus creating an impression of a lighter room.

While embodiments of the present invention are explained in terms of comparing the absolute values of the signal strengths of the detected back-reflected task and ambient beams (or the derivations of those values), a person skilled in the art will realize that sometimes those values need to be normalized in order to obtain a meaningful comparison. The absolute values of the signal strengths of the detected back-reflected signals depend on the emitted flux in each beam, which is not necessarily equal for the task and ambient beams. To account for the differences in the emitted flux of each beam it is, therefore, preferably to normalize the detected signal strength of each back-reflected beam by the lumen output of the light source generating that beam. By this normalization, the signal becomes independent of the settings of the light source.

In an embodiment, to obtain different beam patterns from the first and second light sources, each light source may include a light emitter, such as e.g. one or more light emitting elements such as LEDs, and an associated beam shaping optics. Possible materials that could be used for the LEDs include inorganic semiconductors, such as e.g. GaN, InGaN, GaAs, AlGaAs, or organic semiconductors, such as e.g. small-molecule semiconductors based on Alq3 or polymer semiconductors based e.g. on the derivatives of poly (p-phenylene vinylene) and polyfluorene. The associated beam shaping optics could include appropriately designed lens, TIR (total internal reflection) collimator, or metallic reflector. The beam shaping optics may be configured to generate a beam of a specific width/pattern. For example, for the first light source configured to generate a task beam, the beam shaping optics may be designed to generate a beam corresponding to the size of an office desk or corresponding to the area defined by the typical luminaire spacing in two directions (the latter is particularly advantageous for implementations where it is not known where the desks would be with respect to the luminaires). For the second light source configured to generate an ambient beam, the beam shaping optics may be designed to generate a beam with a relatively low intensity part corresponding to the shape of the task beams and adapted to illuminate the surrounding background area. In this manner, the first and second light sources may be adapted to e.g. provide complementary beam patterns to obtain a smooth total beam pattern for the luminaire.

Further, the emission of the first light source is preferably controlled independently from emission of the second light source, in order to allow for different illumination levels at the task area and at the background area surrounding the task area. As described above, the hollow shaped beam pattern provided by the second light source may be generated using at least one light emitting element and associated beam shaping optics designed to create a hollow beam shape. Alternatively, the second beam of light may be generated using a first and a second light emitting elements of the second light source, the first and second light emitting elements of the second light source being separately controllable with respect to the light emitting element(s) of the first light source, each of the first and second light emitting elements of the second light source configured to generate complementary beam patterns together configured to create the hollow shaped beam pattern. In an embodiment, the first light beam may include first data encoded therein and the second light beam may include second data encoded therein, the data being encoded in any of the conventional manners for encoding data into luminance output of a light source, such as e.g. described in WO2006/111930 or WO2008/050294. In one further embodiment, the first and second data may include data that at least allows the sensor to distinguish between detected back-reflected beams of the first and second light sources and/or that allows a unique identification of the light source that generated the beam. In other embodiments, additional information could be encoded in each of the beams, such as e.g. a lumen output generated by the respective light source, driver settings of the light source, and/or any other information which may be related to the light source.

Even though the first luminaire is described as including the sensor, in other embodiments, the sensor does not have to be included within the first luminaire but could be disposed separately from the luminaire, as long as such sensor is still capable of detecting back-reflected signals of the task and ambient beams produced by the first luminaire.

In an embodiment, the sensor in the first luminaire may further be configured to detect back-reflected signals of the task and ambient beams generated by another, second, luminaire. In such an embodiment, the method may further include the step of estimating the distance between the luminaires based on the comparison of information indicative of a signal strength of the detected back-reflected task light beam of the second luminaire and information indicative of a signal strength of the detected back-reflected ambient light beam of the second luminaire. The dimming levels of the light sources in the first and/or the second luminaires may then be set based on the estimated distance between the luminaires.

In a further embodiment, the information indicative of the signal strengths of the detected back-reflected task and ambient beams of the second luminaire is advantageously determined by normalizing the signal strengths of the detected back-reflected task and ambient beams of the second luminaire with respect to the lumen output of the light sources generating each of the respective beams. Such an embodiment is advantageous because, as described above, by this normalization the signals become independent of the settings of the respective light sources. Without normalization, the ratio of signal strengths is strongly dependent on the emitted flux in each sub-beam, which is not necessarily equal for the task and ambient beams.

According to other aspects of the present invention, a controller for implementing the above method and a luminaire for use with the above method and/or the controller are also disclosed. Also, the present disclosure relates to a computer program with portions, possibly distributed, for performing the various functions described herein and to a data carrier for such software portions.

According to yet another aspect of the present invention, a lighting system for a structure, such as e.g. an office space, is provided. The lighting system includes a system control unit and a plurality of luminaires. Each luminaire includes a first light source configured for emitting a first light beam adapted to illuminate a predefined area, a second light source configured for emitting a second light beam adapted to illuminate a background area surrounding the predefined area, a sensor configured for detecting at least the back-reflected first light beam and the back-reflected second light beam, and an interface configured for providing to the system control unit information indicative of a signal strength of the detected back-reflected first light beam and information indicative of a signal strength of the detected back-reflected second light beam. The system control unit is configured for acquiring the information indicative of the signal strength of the detected back-reflected first light beam and the information indicative of the signal strength of the detected back-reflected second light beam for at least some of the luminaires, and controlling the first light source and/or the second light source, e.g. control the dimming levels, of at least some of the plurality of luminaires based, at least partially, on the acquired information. The system control unit may also acquire a task and background area lighting level configuration for the structure, and control the first and second light sources of at least some of the plurality of luminaires such that a total illumination pattern produced by the plurality of luminaires corresponds to the task and background area lighting level configuration for the structure. In this manner, a centralized management of the luminaires may be achieved.

Hereinafter, an embodiment of the invention will be described in further detail. It should be appreciated, however, that this embodiment may not be construed as limiting the scope of protection for the present invention.

BRIEF DESCRIPTION OF THE DRAWINGS

In all figures, the dimensions as sketched are for illustration only and do not reflect the true dimensions or ratios. All figures are schematic and not to scale. In particular the thicknesses are exaggerated in relation to the other dimensions. In addition, details such as LED chip, wires, substrate, housing, etc. have sometimes been omitted from the drawings for clarity.

FIG. 2A illustrates a sensor being illuminated by direct and forward-reflected beams;

FIG. 2B illustrates a sensor being illuminated by back-reflected beams;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
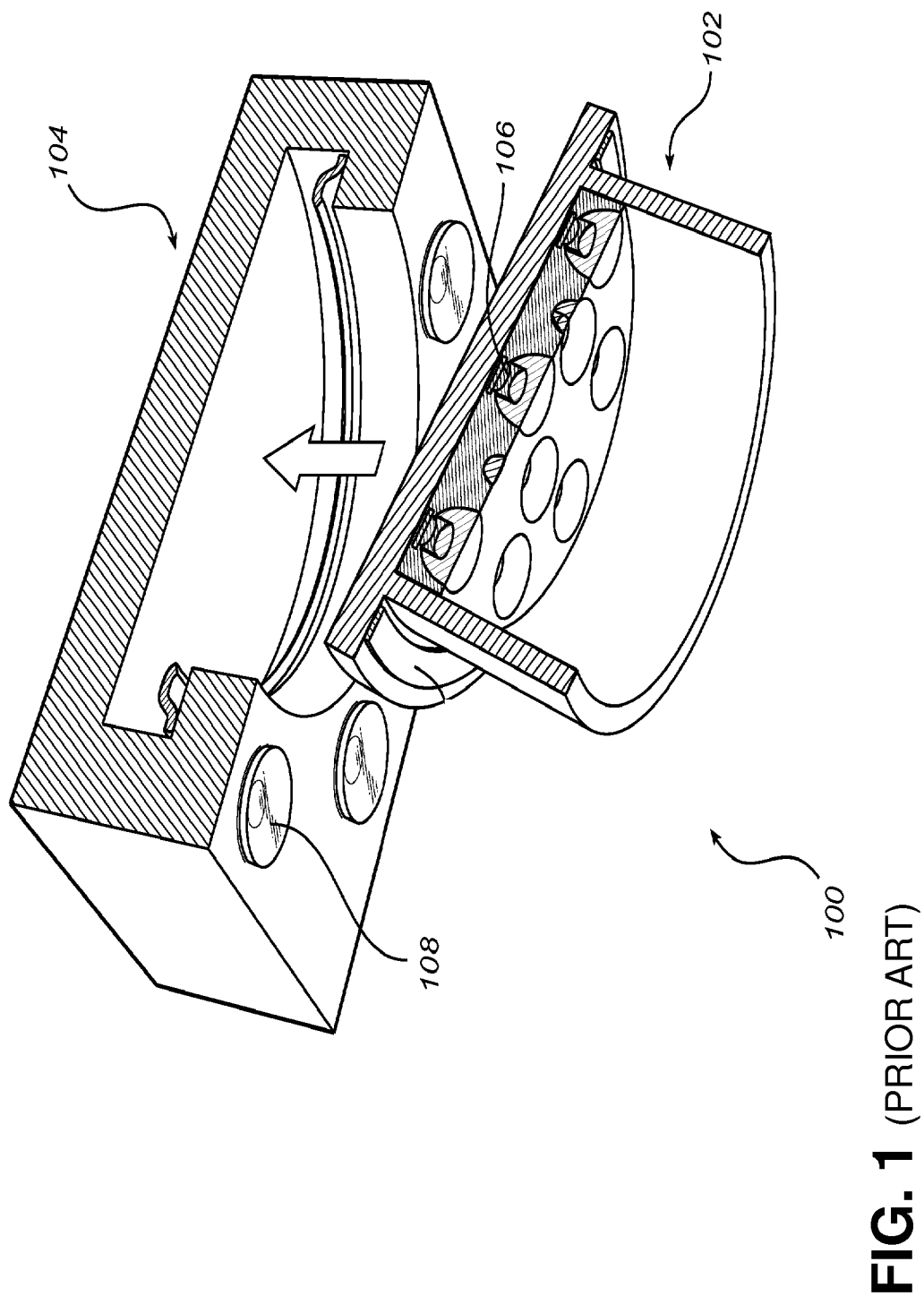
FIG. 1 illustrates a modular split beam luminaire according to prior art.
Figure 3:
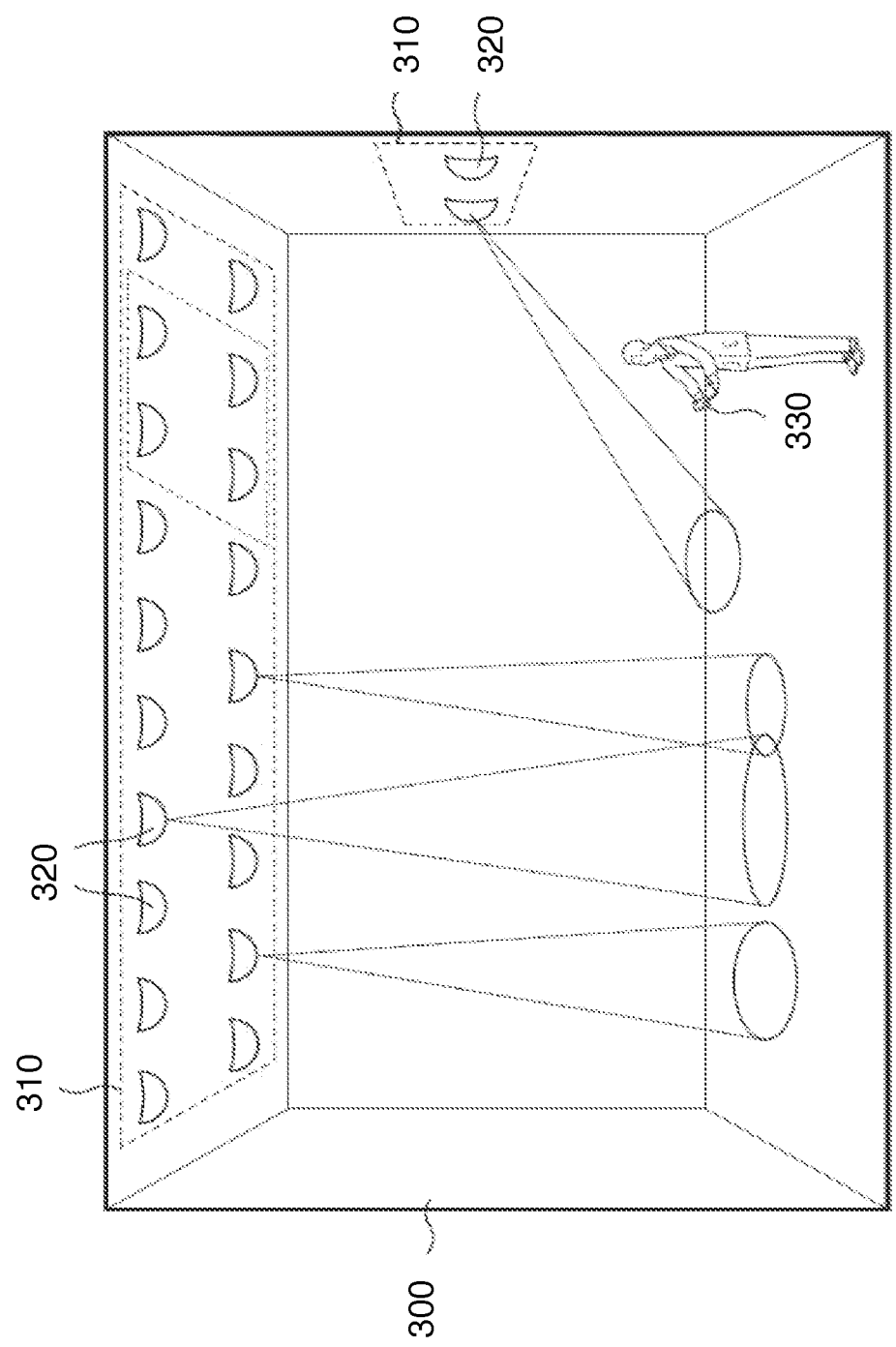
FIG. 3 illustrates an illumination system comprising a plurality of luminaires according to one embodiment of the present invention.

FIG. 3 shows a structure 300—in this case a room—with an installed illumination system 310. The illumination system 310 comprises one or more of luminaires 320 and one or more controllers (not shown in FIG. 3) controlling the luminaires 320. The illumination system 310 may further comprise a remote control 330 allowing a user to control the light sources 320. While FIG. 3 shows that each of the luminaires 320 generate a single beam, this is merely a schematic illustration intended to show that the luminaires 320 are used to provide illumination of the structure 300, while, as described below, each of the luminaires 320 is, preferably, a split-beam luminaire generating two light beams with different beam patterns.

Figure 4:
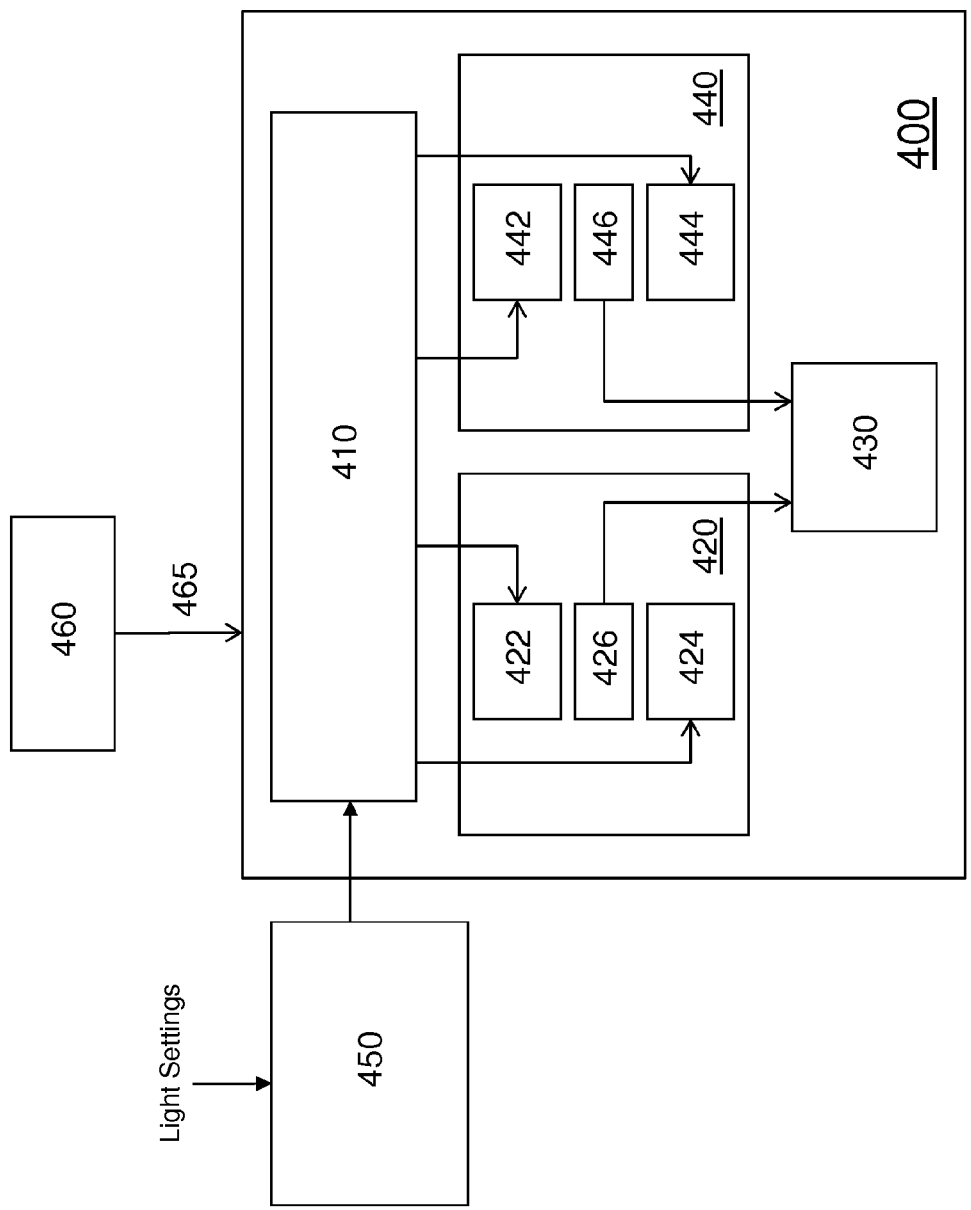
FIG. 4 is a block diagram of an illumination system, according to one embodiment of the present invention.

FIG. 4 is a schematic illustration of an illumination system 400 according to one embodiment of the present invention. The illumination system 400 may be used as the illumination system 310 in the structure 300 illustrated in FIG. 3. As shown, the illumination system 400 includes at least one split beam luminaire 420 comprising at least a first light source 422, a second light source 424, and a sensor 426 and configured to generate light according to light settings. The illumination system 400 further includes a luminaire control unit 410 configured to control the luminaire 420. In addition, the illumination system 400 includes a controller 430 for at least determining presence of objects in the surrounding of the luminaire 420 and/or determining distance from the luminaire 420 to other luminaires in the illumination system 400.

Each of the luminaire control unit 410 and the controller 430 may include a microprocessor, microcontroller, programmable digital signal processor or another programmable device. They may also, or instead, include an application specific integrated circuit, a programmable gate array or programmable array logic, a programmable logic device, or a digital signal processor. Where the luminaire control unit 410 or the controller 430 includes a programmable device such as the microprocessor, microcontroller or programmable digital signal processor mentioned above, the processor may further include computer executable code that controls operation of the programmable device. Additionally, the luminaire control unit 410 and/or the controller 430 may be equipped with communication circuitry for allowing remote control of the lighting level configuration using e.g. the remote control 330 and/or with memory for storing data.

In other embodiments, the illumination system 400 may include additional luminaires and additional luminaire control units controlling the additional luminaires. For example, the illumination system 400 may further include a second split beam luminaire 440 which can include at least a first light source 442 and a second light source 444, and, optionally, also a sensor 446, similar to the sensor 426. Such embodiments will be described herein with a reference to a single luminaire control unit (the system luminaire control unit 410) controlling the various luminaires. However, people skilled in the art will recognize that the system luminaire control unit 410 may comprise individual controllers for each of the luminaires included in the illumination system 400, possibly with one such luminaire control unit included within each luminaire. Similarly, embodiments are described herein with a reference to a single controller 430 determining presence of objects for all of the luminaires included in the illumination system 400, in other embodiments, an individual controller such as the controller 430 could be associated with, and possibly included within, each one of the luminaires.

The operation of the luminaire 420 will now be described in greater detail. The operation of the second luminaire 440 is substantially the same as the operation of the luminaire 420 and, therefore, in the interests of brevity, its description is not repeated here.

The light sources 422 and 424 of the luminaire 420 are configured to emit light beams with different beam patterns. To that end, each of the light sources 422 and 424 may include one or more light emitting elements such as e.g. one or more LEDs (not shown in FIG. 4) and associated beam shaping optics (also not shown in FIG. 4) enabling the light sources 422 and 424 to provide light beams with different predetermined beam patterns. As discussed above, the first light source 422 is configured to provide a task beam with a relatively narrow beam pattern with e.g. 2×25 degrees FWHM, while the second light source 424 is configured to provide an ambient beam with an in comparison broader, preferably hollow, beam pattern, e.g. a beam with a hollow center and peak intensity between 30 and 40 degrees. In one embodiment, the corresponding beam shaping optics for the light sources 422 and 424 may include appropriately designed lenses that could be manufactured by e.g. injection molding in the form of a plate containing an array of such lenses. In alternative embodiments, the beam-shaping optics could include e.g. TIR collimators or metallic reflectors.

The sensor 426 of the luminaire 420 could be any conventional light sensor, preferably a broad-angle light sensor, comprising a photodetector and, possibly, a processing unit, adapted for detecting and being able to differentiate between back-reflected signals of the task and ambient beams generated by the light sources 422 and 424. In addition, the sensor 426 may further be adapted for detecting and being able to differentiate between the back-reflected task and ambient beams generated by the light sources of luminaires other than the luminaire 420 that the sensor 426 is included in, such as e.g. the beams generated by the light sources 442 and 444 of the luminaire 440. In an embodiment, in addition to having a broad-angle light sensor, the sensor 426 could include also a second, presence, sensor (not shown in FIG. 4), e.g. a passive infrared (PIR) or ultrasonic presence sensor, having a detection cone substantially overlapping with the task beam of the light source 422 (i.e., the narrow-angle sensor). Such an embodiment could be advantageous for detecting presence in the area illuminated by the task beam. Functionality of the sensor 426 relevant for the embodiments of the present invention is discussed in greater detail below.

Persons skilled in the art will realize that, even though the sensor 426 is shown in FIG. 4 to be included within the luminaire 420, in other embodiments, the sensor 426 may be implemented separately from the luminaire 420, as long as it is still able to detect the back-reflected task and ambient beams generated by the luminaire 420 at substantially the same signal strengths as if it was included within the luminaire. That means that the sensor 420 could be installed in the vicinity of the luminaire 420 so that the difference in the detected signals strengths of the back-reflected signals between such a sensor and a similar sensor included within the luminaire would be negligible.

The illumination system 400 is configured to operate as follows. As shown in FIG. 4, the light settings for the illumination system 400 are provided to a drive signal generator 450 (which, optionally, may be included within the illumination system 400). The light settings indicate what the average lumen output of each of the two light sources of each of the luminaires 420 and 440 should be in terms, for example, of light power, e.g. defined in lumen, and color. The light settings may be provided by a user via the remote control 330 or may be preprogrammed and provided from an external unit controlling the scene setting. Alternatively, the light settings may be preprogrammed and stored in a memory within the drive signal generator 450 or within the illumination system 400. The drive signal generator 450 translates the light settings into different electrical drive signals for different light sources within the illumination system 400 and provides the drive signals to the system luminaire control unit 410. The drive signals, in turn, control the dimming levels of the different light sources within each of the luminaires of the illumination system 400. For a constant dimming level per light source, the drive signal that is provided from the drive signal generator 450 to the system luminaire control unit 410 comprises a repeated pattern of pulses, a so-called "drive pattern," repeating with a certain frame period. Various methods for dimming the light sources are known to people skilled in the art and, therefore, are not described here in detail. These methods include e.g. pulse width modulation, pulse density modulation, or amplitude modulation.

In one embodiment, the system luminaire control unit 410 may further be configured to receive a data signal 465 from a data source 460. The data signal 465 includes data that the system luminaire control unit 410 could be configured to embed into at least some of the light beams generated by the light sources of the luminaires in the illumination system 400. The data may represent, for example, a localized identification of the illumination system 400, the luminaire 420 and/or it's light sources 422 and 424, their capabilities and current light settings, or other type of information that may be related to the illumination system 400. Alternatively or additionally, the data that is intended to be embedded into the light beams may be pre-stored within the illumination system 400, e.g. stored in the system luminaire control unit 410, and/or obtained from sources other than the data source 460, e.g. from the controller 430.

The system luminaire control unit 410 is then configured to embed the data into at least some light beams generated by the light sources by modulating drive signals applied to those light sources. Various methods for embedding data into the lumen output of the light sources are known to people skilled in the art and, therefore, are not described here in detail.

Figure 5:
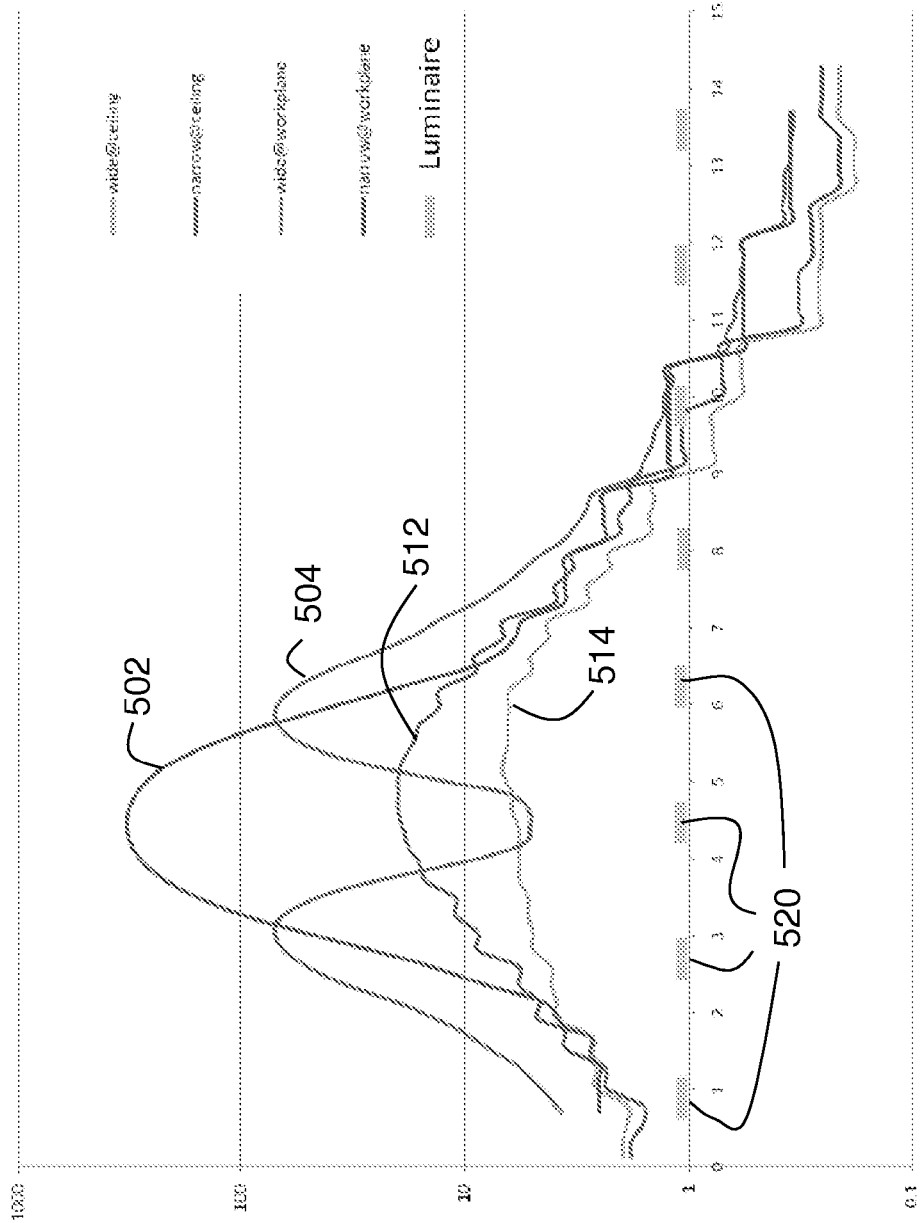
FIG. 5 illustrates a light distribution of an exemplary split beam luminaire in an open-plan office, according to one embodiment of the present invention.

FIG. 5 illustrates a light distribution of an exemplary split beam luminaire in an open-plan office, according to one embodiment of the present invention. The split beam luminaire could e.g. be the luminaire 420 described above, which could be one of the luminaires 320 illustrated in FIG. 3, while the office could be the structure 300. As used herein, the term "open-plan office" refers to a space that is relatively wide open, where a luminaire could be considered to be installed so that there are no walls or high cupboards in its surrounding, as would be present in a "cell office" (i.e., an office space separated into cubicles) or in a relatively narrow corridor.

The horizontal axis of FIG. 5 illustrates position in meters, where the blocks 520 illustrate luminaires such as e.g. luminaires 320 illustrated in FIG. 3, where each of the luminaires 520 could be the luminaire 420 described above. The vertical axis of FIG. 5 illustrates the detected light beams (lux level) on a logarithmic scale.

In FIG. 5, only the third luminaire from the left of all the luminaires 520 is emitting light. Considering that the emitting luminaire is the luminaire 420, this means that the light source 422 is generating a task beam and the light source 424 is generating an ambient beam.

Curves 502 and 504 illustrate signal strengths of the task beam and the ambient beam, respectively, as detected by a lux sensor at a workplane height where the sensor is illuminated by direct and/or forward-reflected task and ambient beams generated by the light sources 422 and 424, respectively. As is clearly seen from the comparison of the curves 502 and 504, the task beam (curve 502) is more localized than the ambient beam (curve 504).

Curves 512 and 514 illustrate signal strengths of the back-reflected task and ambient beams, as detected by a lux sensor at the ceiling, such as the sensor 426 included in the emitting luminaire. The difference between the back-reflected signals of the task and ambient beams illustrated with curves 512 and 514 is less distinct than for curves 502 and 504, where the direct illumination has the dominant contribution, but there is still a clear difference in the signal strength of the detected back-reflected task and ambient beams when measured by a sensor included in the emitting luminaire.

Figure 6:
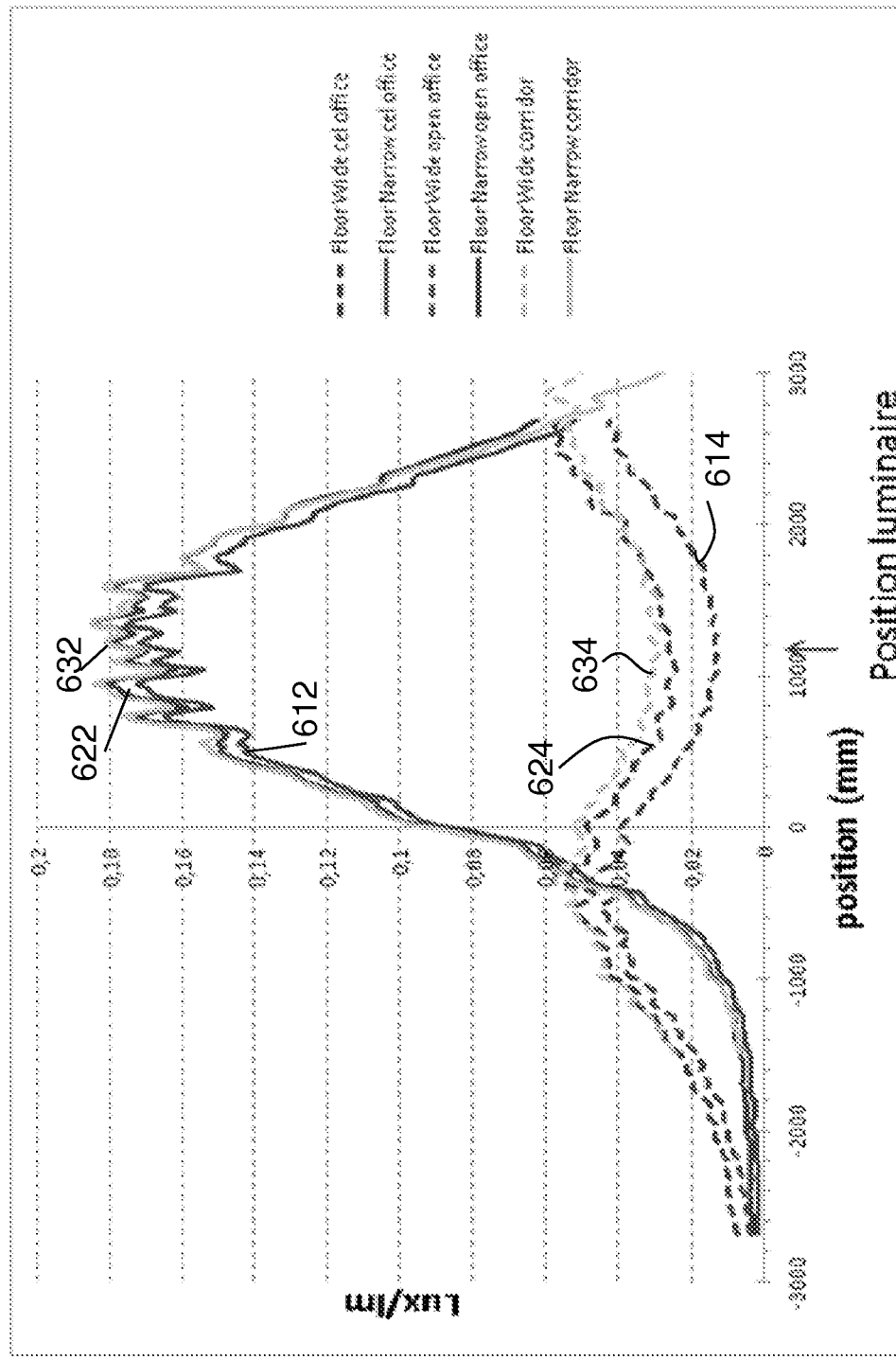
FIG. 6 illustrates a comparison of light distributions of direct or forward-reflected beams of an exemplary split beam luminaire placed in an open-plan office, in a cell office, and in a corridor, according to one embodiment of the present invention.
Figure 7:
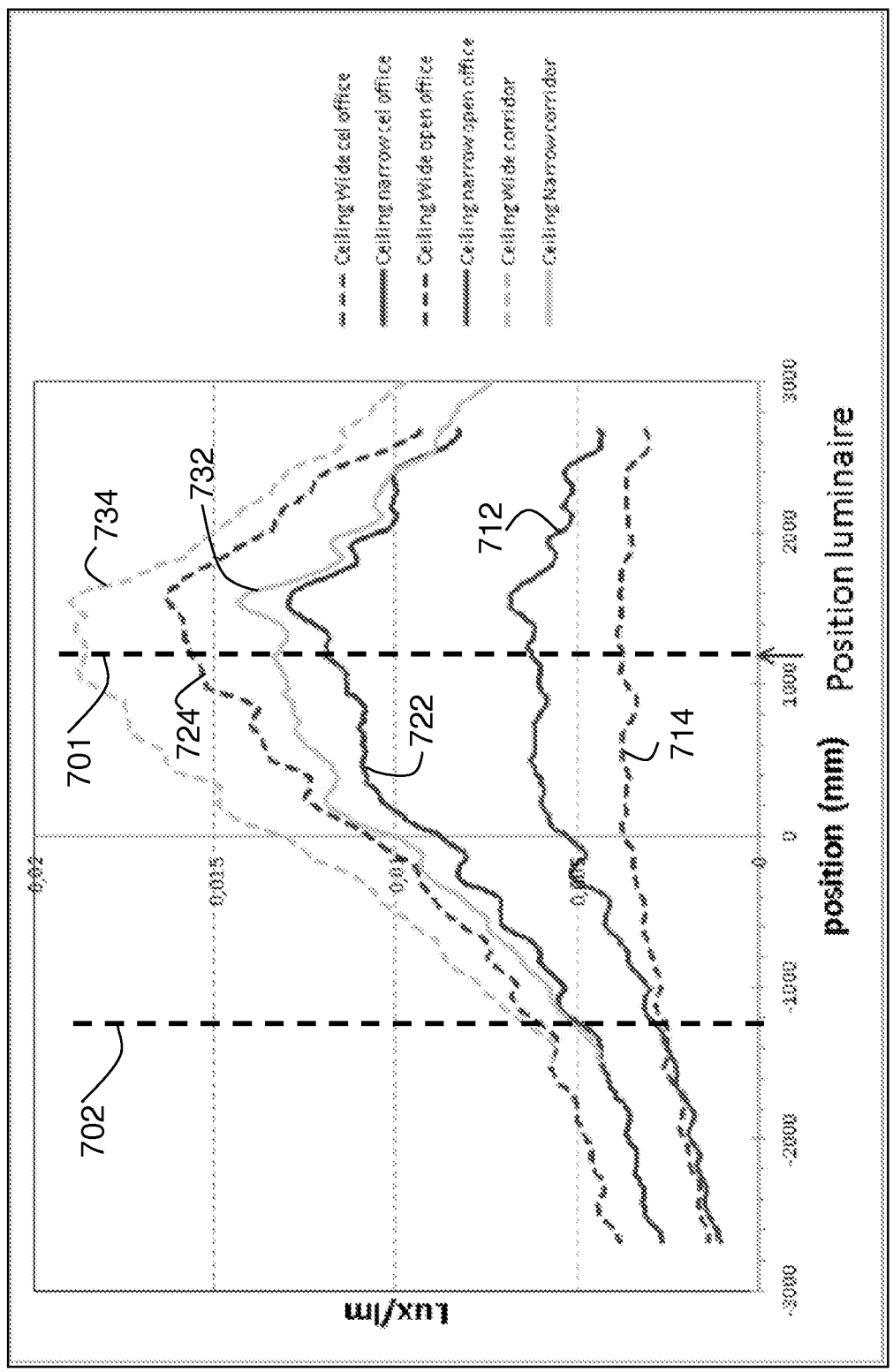
FIG. 7 illustrates a comparison of light distributions of back-reflected beams of an exemplary split beam luminaire placed in an open-plan office, in a cell office, and in a corridor, according to one embodiment of the present invention.

Each of FIGS. 6 and 7 illustrates a comparison of light distributions (lux levels normalized to the lumen output of the source) of an exemplary split beam luminaire placed in different structures comprising an open-plan office, a cell office, and a corridor, according to one embodiment of the present invention. Again, the split beam luminaire could e.g. be the luminaire 420 described above, which could be one of the luminaires 320 illustrated in FIG. 3, while each of the different structures could be the structure 300. To obtain the light distributions of FIGS. 6 and 7, the open-plan office considered was a spacious open office with a luminaire installed in the center so that there are substantially no objects in the area surrounding the luminaire, the cell office was a 3.6×5.4 meters (m) cell office, and the corridor was a corridor of 2 m width. The open-plan office, the cell office, and the corridor differ in the presence of walls that would be in the surrounding of an emitting luminaire, with the open-plan office having the least, if any, of objects such as walls in the surrounding of a luminaire, the cell office having more objects (walls) in the surrounding of a luminaire, and the corridor having the most objects (walls) in the surrounding of a luminaire.

In FIGS. 6 and 7, each of the curves 612 and 712 represent a light distribution of a task beam generated by the light source 422 in the open-plan office, each of the curves 614 and 714 represent a light distribution of an ambient beam generated by the light source 424 in the open-plan office, each of the curves 622 and 722 represent a light distribution of a task beam generated by the light source 422 in the cell office, each of the curves 624 and 724 represent a light distribution of an ambient beam generated by the light source 424 in the cell office, each of the curves 632 and 732 represent a light distribution of a task beam generated by the light source 422 in the corridor, and each of the curves 634 and 734 represent a light distribution of an ambient beam generated by the light source 424 in the corridor. FIG. 6 illustrates the light distribution as measured by a sensor detecting direct and/or forward-reflected light beams, e.g. a sensor placed on the floor or at the workplane area of the structure, while FIG. 7 illustrates the light distribution as detected by a sensor detecting the back-reflected light beams, e.g. a sensor integrated in the ceiling of the structure.

In both FIG. 6 and FIG. 7, the horizontal axis illustrates the position in the plane of measurement (i.e. either the floor/workplane plane of measurement or the ceiling plane) of the sensor detecting lumen output, measured in millimeters (mm), while the vertical axis illustrates the detected illuminance by the light beams (measured in lux) normalized with respect to the lumen output of the light beams generated by the respective light source, measured in lumens (lm). For both figures, the emitting luminaire 420 is located at the position of 1200 mm. Therefore, in both figures, position 1200 mm is also where the detected luminance levels are highest. This means that when the sensor 426 is included within or substantially near the emitting luminaire 420 (i.e. it detects the back-reflected signals, FIG. 7) at the position of 1200 mm, such a sensor will detect the highest values of signals generated by the luminaire 420, the values that could be obtained at the crossing of each of the curves 712, 714, 722, 724, 732, and 734 with a vertical dashed line 701 indicating the position of 1200 mm.

Since this distribution shown in FIG. 6 is mainly determined by direct illumination, the effect of the walls is very small, which can be seen from the analysis of the curves 612, 614, 622, 624, 632, and 634. Thus, FIG. 6 illustrates that the presence of a wall is not easy to deduct from the direct/forward-reflected illumination profile. In contrast, when the light sensor is integrated in the luminaire, i.e. it senses the back-reflected light at level of the luminaire, two effects induced by the presence of a wall may be observed in the light distribution detected by such a sensor, as shown in FIG. 7. Again, for the sensor integrated within the emitting luminaire, illuminance values at the crossing of each of the curves 712, 714, 722, 724, 732, and 734 with a vertical dashed line 701 in FIG. 7 should be considered.

The first effect that can be observed from analyzing the light distributions of FIG. 7 is that the signal strength of the back-reflected beam (for both, the task and the ambient beams) increases as more objects are placed in the surrounding of the luminaire. For the task beam, this can be seen by comparing the curves 712, 722, and 732. As shown in FIG. 7, the signal strength of the back-reflected task beam in the corridor (i.e., the "most objects" situation), illustrated with the curve 732, is greater than the signal strength of the back-reflected task beam in the cell-office (i.e., "less objects than in the corridor" situation), illustrated with the curve 722, which, in turn, is greater than the signal strength of the back-reflected task beam in the open-plan office (i.e., the "no objects" situation), illustrated with the curve 712. This effect on its own could be used to derive information regarding presence of objects in the surrounding of the luminaire. However, this should be done with caution as the signal strength on its own may not be a very reliable trigger because this signal strength may be influenced by many factors, such as the wall paint, floor covering, furniture, etc.

The second effect, however, can be used as a relatively robust trigger for the presence of a wall or at least a very large vertical object. The second effect induced by the presence of walls is that the relative strengths of the back-reflected task light beam and the back-reflected ambient light change order. As shown in FIG. 7, in the open-plan office with no walls in the surrounding of the emitting luminaire, the signal strength of the back-reflected task beam (curve 712) is greater than the signal strength of the back-reflected ambient beam (curve 714). This relation changes to the opposite when there are walls in the surrounding of the luminaire, as can be seen for the cell office and corridor curves of FIG. 7. As shown in FIG. 7, in the cell office with some walls or other objects in the surrounding of the emitting luminaire, the signal strength of the back-reflected ambient beam (curve 724) becomes greater than the signal strength of the back-reflected task beam (curve 722). In the corridor with even more walls or other large vertical objects in the surrounding of the emitting luminaire, this effect is even more pronounced. Like for the cell office, the signal strength of the back-reflected ambient beam in the corridor (curve 734) is also greater than the signal strength of the back-reflected task beam (curve 732), with the difference between signal strengths of the back-reflected ambient and task beams being greater for the corridor (i.e. the difference between curves 734 and 732) than for the cell office (i.e. the difference between curves 724 and 722). The effect of the signal strength of the back-reflected ambient beam becoming greater than the signal strength of the back-reflected task beam may be explained by the fact that, due to the presence of a wall, the back-reflection of ambient light is stronger than that of task light, whereas in the open space the back-reflection of task light is stronger.

As the foregoing illustrates, the second effect may be used to determine presence of objects, in particular, relatively large vertical objects in the surrounding of the emitting luminaire. To that end, returning to the luminaire 420 illustrated in FIG. 4, the sensor 426 could detect the back-reflected beams of the task and ambient beams generated by the light sources 422 and 424, respectively, and provide the values of the detected signal strengths or derivations thereof to the controller 430, possibly after some processing in the processing unit of the sensor 426.

There are various manners of how the sensor 426 could be configured to differentiate between the back-reflected task beam and the back-reflected ambient beam generated by the luminaire 420. In a preferred embodiment, the sensor 426 may be configured to make such a differentiation based on an identification of the light source encoded in each of the task beam and the ambient beam, as described above. However, there are many other ways for the sensor 426 to make such a differentiation that would be known to a person skilled in the art and, therefore, are intended to be within the scope of the present invention. For example, the sensor 426 can differentiate between the back-reflected task and ambient beams because the task and ambient beams are beams of different spectral compositions. Additionally or alternatively, the light sources 422 and 424 could be configured to emit their respective beams sequentially (i.e., not at the same time) and the sensor 426 could be synchronized with such emission, so that the sensor 426 would be able to differentiate between the detected back-reflected signals.

The controller 430 includes at least an interface for receiving data from the sensor 426 as well as, optionally, from other entities such as e.g. the drive signal generator 450, a processing unit for processing data, and, possibly, a memory for storing data (the interface, the processing unit, and the optional memory of the controller 430 are not shown in FIG. 4). The controller 430 may process the values received from the sensor 426 further by e.g. normalizing the signal strengths measured by the sensor 426 with respect to the lumen output, or some information indicative of the lumen output, such as e.g. driver settings, of the beams generated by the light sources of the luminaire 420. In one embodiment, the controller 430 may obtain information indicative of the lumen output of the beams generated by each of the light sources 422 and 424 because that information is e.g. encoded in the light beams produced by the light sources. In another embodiment, information regarding the lumen output could be provided to the controller 430 by the luminaire control unit 410 or may be pre-programmed in the controller 430. Alternatively to the controller 430 performing the processing of data measured by the sensor 426, such processing could also similarly be done within the sensor 426 if the sensor 426 is equipped with some kind of a processing unit, as sensors typically are equipped with. Of course, the information indicative of the detected signal strengths could also be processed both in the sensor 426 and in the controller 430.

The processing unit of the controller 430 may then be configured to determine whether objects are present in the area surrounding the luminaire 420 based on the comparison of the information indicative of the signal strengths of the detected back-reflected task and ambient beams. The processing unit of the controller 430 may be configured to establish that one or more objects are present in the surrounding of the luminaire 420 if the signal strength (or a derivation thereof) of the detected back-reflected ambient beam is greater than the signal strength of the detected back-reflected task beam and, otherwise, to establish that no such objects are present.

As discussed previously herein, the optimum dimming levels of the light sources of a split beam luminaire depend strongly on the type of space that needs to be illuminated, or, in other words, on the presence of objects in the area surrounding the luminaire. In a regular small cell office, the required dimming levels are typically about 20% higher than in an open space office, in order to guarantee a task lighting level of at least 500 lux. At least partially, this is caused by light absorption at the walls of the small office where, typically, an absorption of 50% may be assumed for the walls. In larger offices, however, these losses can be neglected. Furthermore, the relative dimming levels of the task and ambient beams of the luminaire may also be different in a cell office depending on the required light effect. For improved energy saving, it may be advantageous to reduce the ambient beam with respect to the task beam, such that the light loss at the wall may be reduced. For improved visual comfort, however, the ambient light beam at the walls could be increased with respect to the task light, since the light level perception in a room is dominated by the vertical illuminance of walls and cupboards and not by horizontal illuminance of task areas. In any case, the dimming levels of a split beam luminaire located close to a wall should preferably differ from the dimming levels of the same luminaire in the middle of a large office. Therefore, the controller 430 may then be configured to provide an instruction to the luminaire control unit 410 to adjust the dimming level(s) of the first and/or second light sources of the luminaire 420 in accordance with the determination of whether or not objects are present in the area surrounding the luminaire 420. For example, when the controller 430 determines that objects are present in the area surrounding the luminaire 420, the dimming levels of the task and ambient beams may be adjusted to a "wall-mode," as described above.

In an embodiment, in addition to or instead of enabling the determination of object presence in the surrounding of the luminaire 420 by detecting the back-reflected task and ambient beams generated by the luminaire 420, the sensor 426 may be used to enable the estimation of distance from the luminaire 420 to another luminaire within the illumination system 400, e.g. the second luminaire 440.

As described above, the second luminaire 440 includes at least the first light source 442 and the second light source 444 configured to emit task and ambient light beams, respectively, similar to the light sources 422 and 424 described above. The sensor 426 of the first luminaire 420 may then be configured to detect the back-reflected task and ambient beams generated by the light sources of the second luminaire 440. To that end, the sensor 426 may be configured to differentiate between the detected back-reflected task and ambient beams of the second luminaire 440 in one of the manners described above for differentiating between the different beams of the first luminaire 420. Again, in a preferred embodiment, the differentiation would be done based on the unique identification codes included in the task and ambient light beams generated by the second luminaire 440.

The sensor 426 would then provide the detected values to the controller 430, possibly with some processing of the values, as described above for the signals detected from the luminaire 420, which would compare the information indicative of the signal strengths of the detected back-reflected task and ambient beams of the second luminaire to estimate the distance from the sensor 426 to the second luminaire 440. When the sensor 426 is included within or substantially near the luminaire 420, the estimated distance would also be the distance between the luminaires 420 and 440.

To understand better how it is possible to estimate the distance in this manner, FIG. 7 could be considered again. As described above, the horizontal axis of FIG. 7 illustrates position of the sensor measuring the signals, and for determination of presence in the surrounding of the luminaire, the luminance values detected along the dashed line 701 were considered. Now, considering that the emitting luminaire, the luminaire 440, is still positioned at the position 1200 mm on FIG. 7, a sensor located at e.g. position −1200 mm would detect the values along a dashed line 702. As can be seen from comparing the values of the six curves illustrated in FIG. 7 for different positions of the sensor in the plane of measurement, particularly from comparing the values along the line 701 and the values along the line 702, the difference between the detected back-reflected task and ambient beams of an emitting luminaire is decreasing as the sensor is positioned further and further away from the emitting luminaire. This effect can be used to determine the distance from the luminaire in which sensor is taking measurements of the back-reflected task and ambient beams of the other luminaire to the other luminaire that's actually generating the task and ambient beams being measured.

Figure 8:
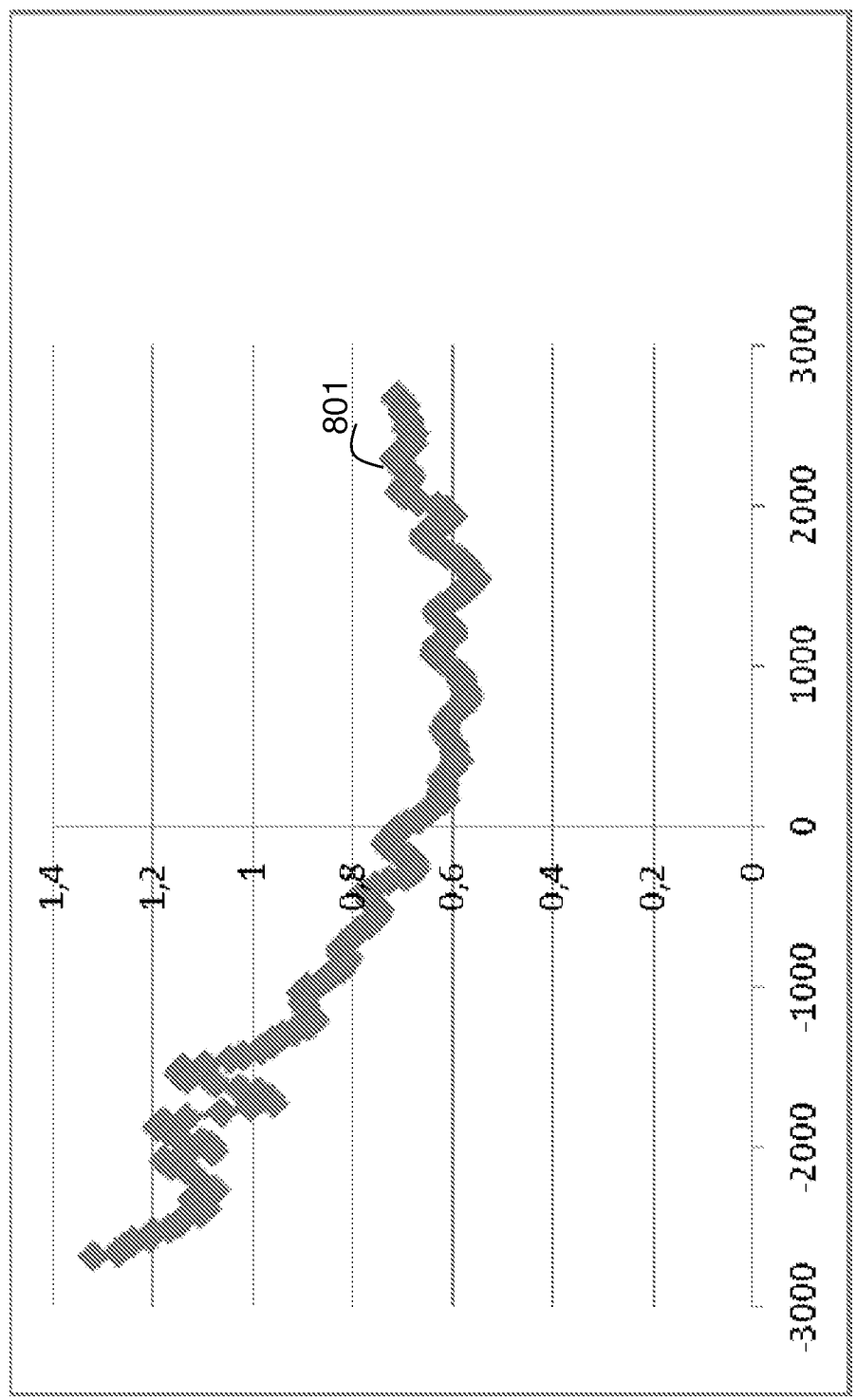
FIG. 8 illustrates the ratio of the signal strengths of back-reflected ambient beam and task beam vs distance for the open-plan office, according to one embodiment of the present invention.

FIG. 8 illustrates the ratio of the signal strengths of back-reflected ambient beam and task beam vs distance for the open-plan office. As shown with curve 801 in FIG. 8, the ratio is smallest at the location of the emitting luminaire (i.e., at the position 1200 mm), and then increases with distance. In view of that, the controller 430 could be e.g. configured with a predetermined cutoff value for the ratio of when the luminaire comprising the sensor that's detecting back-reflected signals from the other luminaire can be considered to be nearest neighbor for the other luminaire. For example, based on the measurements of the back-reflected signals taken by the sensor 426 of the first luminaire 420, the controller 430 could be configured to determine the ratio and then indicate that the second luminaire 440 is the nearest neighbor to the luminaire 420 if the determined ratio is less than 1.1, preferably less than 1.0, and most preferably less than 0.8. If the ratio was greater than that predetermined value, the second luminaire 440 would be considered to be a long distance luminaire with respect to the luminaire 420.

Alternatively or additionally, the controller 430 could be provided with a look-up table containing different ratio values and corresponding distances between luminaires and be configured to determine the distance based on comparing normalized signal strengths of the back-reflected task and ambient beams of the second luminaire (i.e., determining the ratio) and then looking up the value for the distance corresponding to this ratio.

In an embodiment, in addition to determining the distance to the second luminaire based on the comparison of normalized signal strengths of the back-reflected task and ambient beams of the second luminaire, the controller 430 may have access to additional information that may be used to determine accuracy of the determined distance, correct the determined distance, and/or supplement the determination of the distance. For example, the sensor 446 of the second luminaire 440 could be configured to detect the relative signal strengths of the back-reflected signals of the task and ambient beams generated by the second luminaire 440 (i.e., the values at position 1200 in FIG. 7) and then the detected relative signal strengths may either be encoded in the light beams generated by the luminaire 440 or provided to the controller 430 in some other manner. The controller 430 could then be configured to compare the relative signal strengths of the ambient and task beams of the second luminaire 440 as detected by the sensor 426 of the first luminaire 420 with the local signal strengths at the emitting source (i.e., the values provided from the measurements at the luminaire 440) to obtain information indicative of the reduction in signal strength of the light beams generated by the second luminaire. The controller 430 could then use the obtained information regarding the reduction in signal strength to supplement the determination of the distance between the first luminaire 420 and the second luminaire 440 or to check and/or correct the distance determined based on the comparison of the back-reflected task and ambient beams of the second luminaire as detected by the sensor of the first luminaire. In this manner, the controller 430 could have three inputs for determining the distance to the second, emitting, luminaire: ratio of back-reflected task and ambient signals as detected by the sensor in the first luminaire, decrease in back-reflected task signal from the value detected by the sensor in the second luminaire to the value detected by the sensor in the first luminaire, and decrease in back-reflected ambient signal from the value detected by the sensor in the second luminaire to the value detected by the sensor in the first luminaire.

Figure 9:
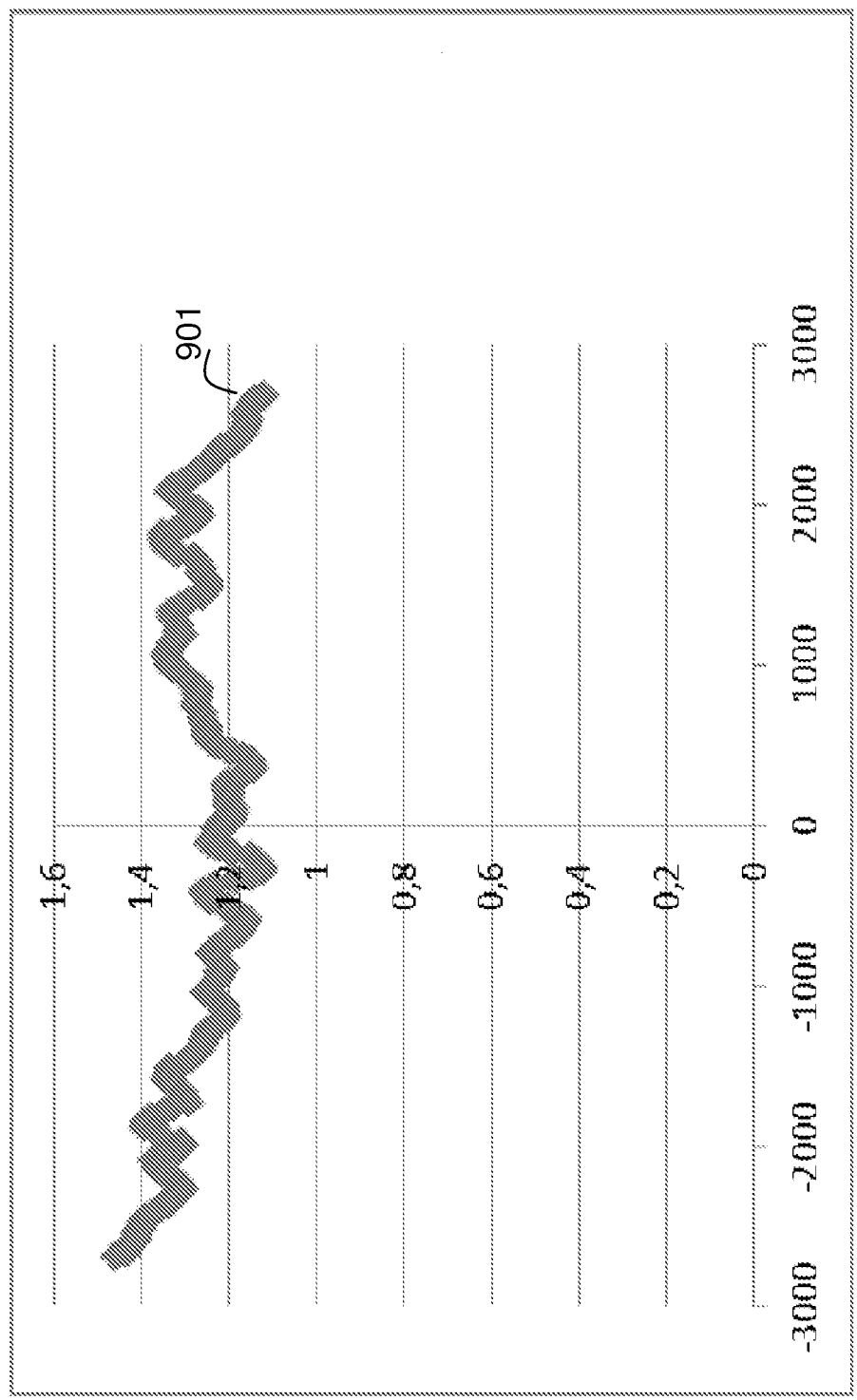
FIG. 9 illustrates the ratio of the signal strengths of back-reflected ambient beam and task beam vs distance for the cell office, according to one embodiment of the present invention.

FIG. 9 illustrates the ratio of the signal strengths of back-reflected ambient beams and task beam vs distance for the cell office. Compared with the curve 801 of FIG. 8, as shown with curve 901 in FIG. 9, in the cell-office the ratio stays roughly the same and provides less information about distance. But, since the cell-office considered was small anyway, there is no need to estimate distance because in such a small office all luminaires could be considered to be nearest neighbors.

Based on the estimated distance between the luminaires, the controller 430 may then be configured to provide an instruction to the luminaire control unit 410 to adjust the dimming level(s) of the first and/or second light sources of the luminaire 420 and/or of the luminaire 440, depending on the distance between these luminaires. As a result, the luminaires close to the task lighting luminaire, i.e. close to the sitting person, can be set to e.g. a 300 lux ambient light setting, whereas the luminaires far from that person may be set to an even lower light level, like 100 lux.

Adjusting the dimming levels of the luminaires based on the distance between them allows saving additional energy in the illumination system 400 by avoiding overshoot. When all luminaires are in task lighting mode, the general light level is higher than 500 lux because this is needed to guarantee a 500 lux task level below an isolated task luminaire when all other luminaires are in the ambient mode. The overshoot of about 10-20% is, therefore, needed to compensate for the reduced light level at the task area by the dimmed neighboring luminaires. When a sufficient number of neighboring luminaires are in task lighting mode, the overshoot is not needed and the task lighting luminaire may dim down by 10-20%. This may be sensed by counting the number of task lighting signals and estimating their distance by the method described above for creating zones.

While the controller 430 has been illustrated in FIG. 4 as a unit separate from the luminaire control unit 410 and the luminaire 420, in other embodiments, functionality of the controller 430 and the luminaire control unit 410 could be combined in a single unit or, conversely, distributed over a greater number of controllers. Further, the luminaire control unit 410 and/or the controller 430 could be included within the luminaire 420.

The embodiment where both the luminaire control unit 410 and the controller 430 would be included within the luminaire 420 (either as a signal controller or as multiple units) could be particularly advantageous because then the luminaire 420 could then be a self-standing luminaire that can automatically adapt its dimming levels to the presence of walls and/or distance to other luminaires in the illumination system. The illumination system 400 could then comprise a plurality of such self-standing luminaires, each of them capable of automatically adapt its dimming levels.

If, however, the controller 430 is not included within the luminaire 420, then the luminaire 420 could include an interface (not shown in FIG. 4) configured for at least providing to the controller 430, from the sensor 426, information indicative of the signal strengths of the detected back-reflected task and ambient light beams. In such an embodiment, preferably, the luminaire control unit 410 for controlling the luminaire 420 would be included within the luminaire. Then the luminaire 420 could receive from the controller 430, via the interface, presence information indicative of whether or not objects are present in the area surrounding the luminaire and/or information regarding distance to other luminaires and the luminaire control unit 410 would then adjust dimming levels of the task and/or ambient light beams of the luminaire 420 in accordance with that information. In this manner, the luminaire 420 would be able to configure itself based, at least partially, on whether or not the objects are present in the surrounding of the luminaire and/or the presence of and/or distance to the neighboring luminaires, as determined by the controller 430.

In the latter embodiment, each split beam luminaire within the illumination system 400 could include an associated controller such as the controller 430, where the controller would provide instructions regarding the dimming levels of that luminaire based on the information determined by the controller for that particular luminaire (e.g. the presence of objects in the surrounding of that luminaire or presence of and/or distance to the neighboring luminaire from that particular luminaire). Alternatively, there could be a common system controller 430 which would collect and analyze data for multiple luminaires in the illumination system 400 and then provide instructions regarding the dimming levels of individual luminaires based on the presence information and/or distance information determined for different luminaires. In this manner, a centralized control over the luminaires may be implemented which may enable better decision-making with respect to the dimming levels of the individual luminaires in terms e.g. of decreased energy consumption. Further, a combination of central control for the some luminaires and local control for the other luminaires may also be possible and is within the scope of the invention.

The system controller 430 of the last embodiment may further be configured to acquire a lighting level configuration for the structure 300, e.g. for general areas, wall areas, and/or desk areas, and to control the first and second light sources of at least some of the luminaires 320 such that a total illumination pattern produced by the plurality of luminaires 320 corresponds to the lighting level configuration for the structure 300. The lighting level configuration for the structure 300 may be adjusted according to a fixed predetermined illumination pattern or may be dependent on e.g. information regarding presence of objects in the surrounding(s) of one or more luminaires and/or distance between the luminaires. The lighting level configuration for the structure 300 may include not only illumination levels for the different areas of the structure, but may also relate to a specifically selected color temperature, e.g. within one or a plurality of areas of the structure. Dynamic adjustment is thus possible and allows for improvements in relation to energy consumptions for the structure 300. Further sensors may be provided, either integrated or separately, and possibly connectable to the one or more of the luminaires 320. Such sensors may include e.g. day light detection and the system controller 430 may be configured to also take such information into account when dynamically adjusting the illumination levels, locally and within the whole structure 300.

In addition, in an embodiment, the luminaires of the illumination system 400 are preferably also configured to interact wirelessly with other luminaires in the lighting system and with the people in the room (via the remote control 330, for example). This may be implemented by encoding information into the light beams generated by the task and ambient light sources. For example, different codes included in the light beams may be used to communicate different states (ambient/task lighting) to neighboring luminaires in the illumination system 400, such that they can react accordingly, and/or the estimated distance between luminaire, as determined by signals received in one luminaire, can be communicated to other luminaires and/or some central control unit of the illumination system 400.

One embodiment of the invention may be implemented as a program product for use with a computer system. The program(s) of the program product define functions of the embodiments (including the methods described herein) and can be contained on a variety of, preferably non-transitory, computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Further, in the claims, the word "comprising" does not exclude other elements or steps, and the indefinite article "a" or "an" does not exclude a plurality

The invention claimed is:

1. A method for determining a presence of one or more objects in an area, the method comprising the steps of:
   providing a first luminaire comprising a first light source, a second light source, and a sensor, wherein the first light source is configured to emit a narrow, first light beam adapted to illuminate a first predefined area, the second light source is configured to emit a wide, second light beam adapted to illuminate a background area surrounding the first predefined area, and the sensor is configured to detect at least a back-reflection of the first light beam and a back-reflection of the second light beam:
   simultaneously detecting at a first time-point, with the sensor, the back-reflection of the first light beam and the back-reflection of the second light beam;
   providing the detected sensor information from the first time-point to a controller;
   comparing, by the controller, sensor information indicative of a signal strength of the detected back-reflected first light beam to sensor information indicative of a signal strength of the detected back-reflected second light beam, wherein said comparing step comprises determining whether the signal strength of the detected back-reflected second light beam normalized to a lumen output of the second light source is greater than the signal strength of the detected back-reflected first light beam normalized to a lumen output of the first light source; and
   determining whether the one or more objects are present in the area based on the outcome of said comparing, wherein the one or more objects are determined to be present in the area when the normalized signal strength of the detected back-reflected second light beam is determined to be greater than the normalized signal strength of the detected back-reflected first light beam, and further wherein the one or more objects are determined to not be present in the area when the normalized signal strength of the detected back-reflected first light beam is determined to be greater than the normalized signal strength of the detected back-reflected second light beam.

2. The method according to claim 1, further comprising the step of providing an instruction to the first luminaire to adjust a dimming level of the first light source and/or a dimming level of the second light source based, at least partially, on the determination of whether the one or more objects are present in the area surrounding the luminaire.

3. The method according to claim 1, wherein the first light beam comprises first data encoded therein, the first data comprising at least an identification of the first light source and, optionally, information indicative of a lumen output of the first light source, and further wherein the second light beam comprises second data encoded therein, the second data comprising at least an identification of the second light source and, optionally, information indicative of a lumen output of the second light source.

4. The method according to claim 1, further comprising the steps of:
   estimating a distance from the first luminaire to a second luminaire, the second luminaire comprising at least a third light source and a fourth light source, wherein: (i) the third light source is configured to emit a third light beam adapted to illuminate a second predefined area; (ii) the fourth light source is configured to emit a fourth light beam adapted to illuminate a background area surrounding the second predefined area; and (iii) the sensor of the first luminaire is configured to further detect a back-reflected third light beam and a back-reflected fourth light beam; and
   estimating the distance from the first luminaire to the second luminaire based, at least partially, on a comparing of information indicative of a signal strength of the detected back-reflected third light beam and information indicative of a signal strength of the detected back-reflected fourth light beam.

5. The method according to claim 1, further comprising the steps of:
   determining the information indicative of the signal strength of the detected back-reflected third light beam by normalizing the signal strength of the detected back-reflected third light beam by a lumen output of the third light source; and
   determining the information indicative of the signal strength of the detected back-reflected fourth light beam by normalizing the signal strength of the detected back-reflected fourth light beam by a lumen output of the fourth light source.

6. The method according to claim 5, wherein information indicative of the lumen output of the third light source is encoded in the third light beam and information indicative of the lumen output of the fourth light source is encoded in the fourth light beam.

7. The method according to claim 4, further comprising the step of providing an instruction to the first luminaire to adjust a dimming level of the first light source and/or a dimming level of the second light source based, at least partially, on the estimated distance from the first luminaire to the second luminaire.

8. A luminaire comprising:
   a first light source configured to emit a narrow first light beam adapted to illuminate a first predefined area;
   a second light source configured to emit a wide second light beam adapted to illuminate a background area surrounding the first predefined area;
   a sensor configured to simultaneously detect at a first time-point at least a back-reflected first light beam and a back-reflected second light beam; and
   a controller configured to: (i) receive the sensor information obtained at the first time-point; (ii) compare, using the sensor information, information indicative of a signal strength of the detected back-reflected first light beam to information indicative of a signal strength of the detected back-reflected second light beam, wherein said compare comprises determining whether the signal strength of the detected back-reflected second light beam normalized to a lumen output of the second light source is greater than the signal strength of the detected back-reflected first light beam normalized to a lumen output of the first light source; and (iii) determine, based on the outcome of the compare, whether one or more objects are present in an area surrounding the luminaire.

9. A luminaire configured to determine a presence of one or more objects in an area, the luminaire comprising:
   a first light source configured for emitting a narrow first light beam adapted to illuminate a first predefined area;
   a second light source configured for emitting a wide second light beam adapted to illuminate a background area surrounding the first predefined area;
   a sensor configured for simultaneously detecting at a first time-point at least the a back-reflected first light beam and a back-reflected second light beam;
   an interface configured to: (i) provide to the controller, from the sensor, a information indicative of the signal strength of detected back-reflected first light beam; (ii) provide to the controller the information indicative of the signal strength of the detected back-reflected second light beam; and (iii) receive from the controller presence information indicative of whether the one or more objects are present in the area surrounding the luminaire, the presence information based on a comparison of the information indicative of the signal strength of the detected back-reflected first light beam and the information indicative of the signal strength of the detected back-reflected second light beam; and
   a luminaire control unit configured for adjusting a dimming level of the first light beam and/or a dimming level of the second light beam based, at least partially, on the received presence information.

10. The luminaire according to claim 9, wherein the dimming level of the first light beam and/or the dimming level of the second light beam is adjusted further based on a distance to another luminaire.

11. A lighting system for a structure, comprising:
   a system control unit; and
   a plurality of luminaires, each luminaire comprising:
      a first light source configured to emit a narrow first light beam adapted to illuminate a predefined area;
      a second light source configured to emit a wide second light beam adapted to illuminate a background area surrounding the predefined area;
      a sensor configured for simultaneously detecting at a first time-point at least a back-reflected first light beam and a back-reflected second light beam; and
      an interface configured to provide providing to the system control unit information indicative of a signal strength of the detected back-reflected first light beam and a information indicative of the signal strength of detected back-reflected second light beam;
   wherein the system control unit is configured to: (i) acquire a information indicative of the signal strength of detected back-reflected first light beam and a information indicative of the signal strength of detected back-reflected second light beam for at least some of the plurality of luminaires; and (ii) control the first light source and/or the second light source of at least some of the plurality of luminaires based, at least partially, on the acquired information.

\* \* \* \* \*